US012666251B2

(12) United States Patent
Hong

(10) Patent No.: US 12,666,251 B2
(45) Date of Patent: Jun. 23, 2026

(54) CAPABILITY DETERMINATION METHOD AND APPARATUS, CAPABILITY INDICATION METHOD AND APPARATUS, COMMUNICATION APPARATUS AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Bejing (CN)

( * ) Notice: Subject to any disclaimer, the term of this patent is extended or adjusted under 35 U.S.C. 154(b) by 329 days.

(21) Appl. No.: 18/689,695

(22) PCT Filed: Sep. 7, 2021

(86) PCT No.: PCT/CN2021/117043
§ 371 (c)(1),
(2) Date: Mar. 6, 2024

(87) PCT Pub. No.: WO2023/035121
PCT Pub. Date: Mar. 16, 2023

(65) Prior Publication Data
US 2025/0133391 A1     Apr. 24, 2025

(51) Int. Cl.
*H04W 8/24* (2009.01)
*H04W 88/06* (2009.01)

(52) U.S. Cl.
CPC ............ *H04W 8/245* (2013.01); *H04W 88/06* (2013.01)

(58) Field of Classification Search
CPC ..... H04W 8/245; H04W 88/06; H04W 8/183; H04W 8/24; H04W 36/00

USPC ......................................................... 455/419
See application file for complete search history.

(56) References Cited

U.S. PATENT DOCUMENTS

| | | | | |
|---|---|---|---|---|
| 8,160,056 | B2 * | 4/2012 | Van der Merwe ...... | H04L 45/04 |
| | | | | 709/239 |
| 12,041,605 | B2 * | 7/2024 | Lovlekar ........... | H04W 72/1268 |
| 12,556,958 | B2 * | 2/2026 | Li ......................... | H04W 24/10 |
| 2018/0146365 | A1 * | 5/2018 | Dhanapal .............. | H04W 8/183 |

(Continued)

FOREIGN PATENT DOCUMENTS

| | | | | |
|---|---|---|---|---|
| CN | 109644391 A | * | 4/2019 | ......... H04L 63/0853 |
| CN | 112219429 A | | 1/2021 | |

(Continued)

OTHER PUBLICATIONS

State Intellectual Property Office of the People's Republic of China, Office Action and Search Report Issued in Application No. 2021800028912, Jun. 6, 2025, 26 pages. (Submitted with English Translation).

(Continued)

*Primary Examiner* — Mahendra R Patel
(74) *Attorney, Agent, or Firm* — Volpe Koenig

(57) ABSTRACT

Provided are capability determination methods and apparatuses, capability indication methods and apparatuses, communication apparatuses and storage media, where the capability indication method includes: receiving capability indication information sent by a network side device; and determining, according to the capability indication information, a support capability of the network side device for the terminal to perform multi-SIM connection switching.

17 Claims, 4 Drawing Sheets

(56) References Cited

U.S. PATENT DOCUMENTS

| | | | | | |
|---|---|---|---|---|---|
| 2021/0022209 | A1 * | 1/2021 | Singh | .................... | H04W 8/183 |
| 2021/0084536 | A1 * | 3/2021 | Chou | ............... | H04W 36/0085 |
| 2023/0093965 | A1 * | 3/2023 | Velev | .................... | H04W 68/12 |
| | | | | | 455/458 |
| 2024/0179678 | A1 * | 5/2024 | Hong | .................... | H04W 68/02 |

FOREIGN PATENT DOCUMENTS

| | | | | | |
|---|---|---|---|---|---|
| CN | 112492694 | A | | 3/2021 | |
| CN | 112752279 | A | | 5/2021 | |
| CN | 115175313 | A | * 10/2022 | .......... H04W 68/005 |
| CN | 112492694 | B | * 11/2023 | ........... H04W 72/51 |
| EP | 2879439 | A1 | * 6/2015 | ........... H04W 48/12 |
| WO | WO-2015043050 | A1 | * 4/2015 | ........... H04W 72/51 |
| WO | WO-2021062822 | A1 | * 4/2021 | ........... H04W 68/02 |
| WO | WO-2021113581 | A1 | * 6/2021 | .......... H04W 68/005 |
| WO | WO-2021126948 | A1 | * 6/2021 | .......... H04W 36/322 |
| WO | WO-2021141770 | A1 | * 7/2021 | ....... G06F 18/23211 |
| WO | WO-2021155188 | A1 | * 8/2021 | ........... G06Q 40/04 |
| WO | WO-2022222076 | A1 | * 10/2022 | ........... H04W 8/183 |
| WO | WO-2022248911 | A1 | * 12/2022 | ........... H04B 7/022 |

OTHER PUBLICATIONS

Vivo, "[post112-e][256][Multi-SIM] Network switching details (vivo)", R2-2102262, 3GPP TSG-RAN WG2 Meeting #113-e, Online, Jan. 25-Feb. 5, 2021, 46 pages.

"Share Technote Series LTE (7): SIB Scheduling", blog.csdn.net, Jul. 22, 2019, 14 pages. (Submitted with English Translation).

ISA State Intellectual Property Office of the People's Republic of China, Written Opinion of the International Searching Authority Issued in Application No. PCT/CN2021/117043, Apr. 26, 2022, WIPO, 8 pages.

ISA State Intellectual Property Office of the People's Republic of China, International Search Report Issued in Application No. PCT/CN2021/117043, Apr. 26, 2022, WIPO, 6 pages.

Apple Inc."Signaling aspects of MUSIM Network Switching", 3GPP TSG-RAN WG2 Meeting # 113 bis Electronic R2-2103831, Apr. 2, 2021,7 pages.

Apple Inc. "MUSIM Network Switching", 3GPP TSG-RAN WG2 Meeting # 115 Electronic R2-2107597, Aug. 6, 2021,7 pages.

China Telecom."Discussion on Multi-SIM enhancement for dual TX/ dual Rx devices in Rel-18"3GPP TSG RAN Meeting #91e RP-210432, Mar. 15, 2021,4 pages.

* cited by examiner

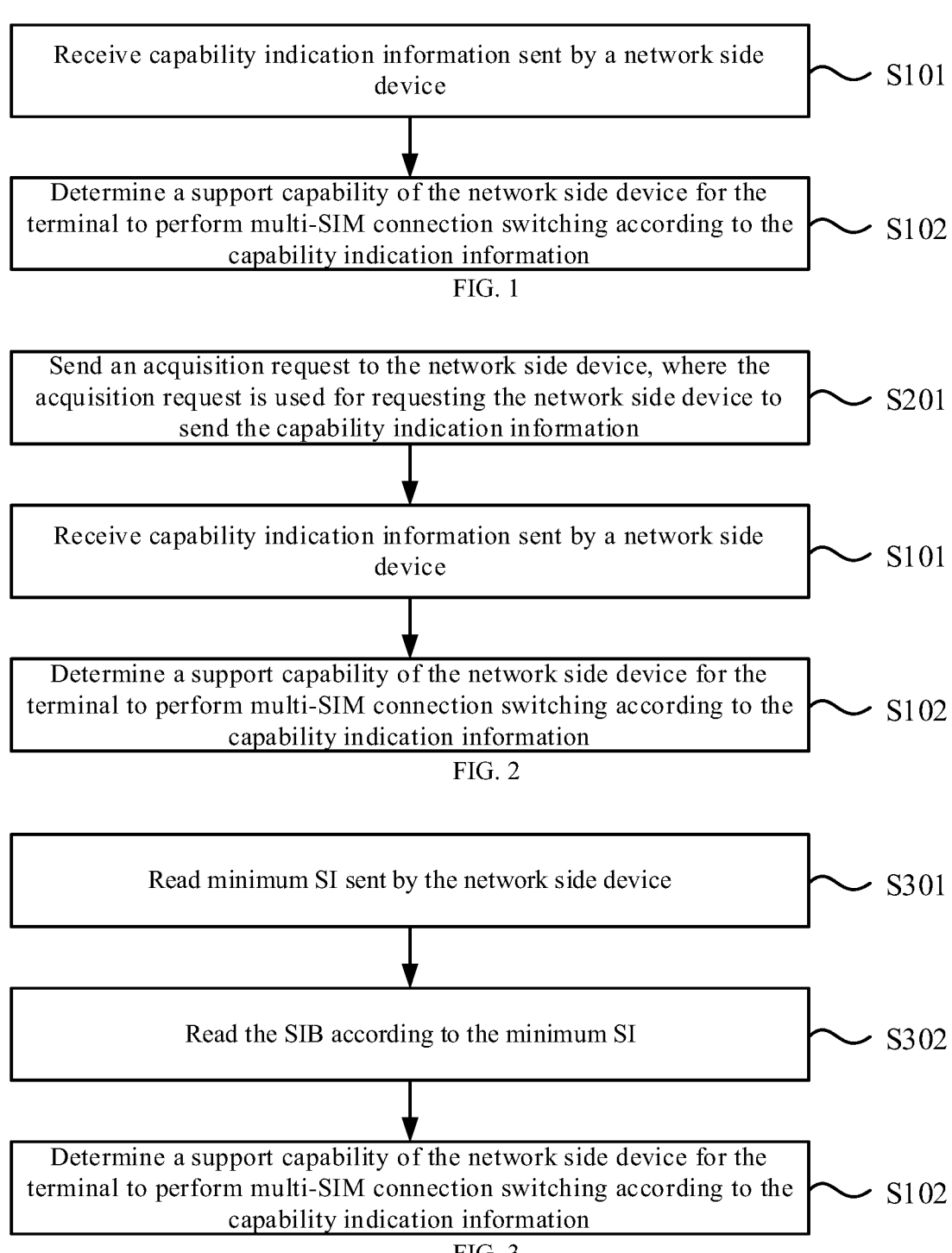

| Receive capability indication information sent by a network side device | S101 |

| Determine a support capability of the network side device for the terminal to perform multi-SIM connection switching according to the capability indication information | S102 |

FIG. 1

| Send an acquisition request to the network side device, where the acquisition request is used for requesting the network side device to send the capability indication information | S201 |

| Receive capability indication information sent by a network side device | S101 |

| Determine a support capability of the network side device for the terminal to perform multi-SIM connection switching according to the capability indication information | S102 |

FIG. 2

| Read minimum SI sent by the network side device | S301 |

| Read the SIB according to the minimum SI | S302 |

| Determine a support capability of the network side device for the terminal to perform multi-SIM connection switching according to the capability indication information | S102 |

FIG. 3

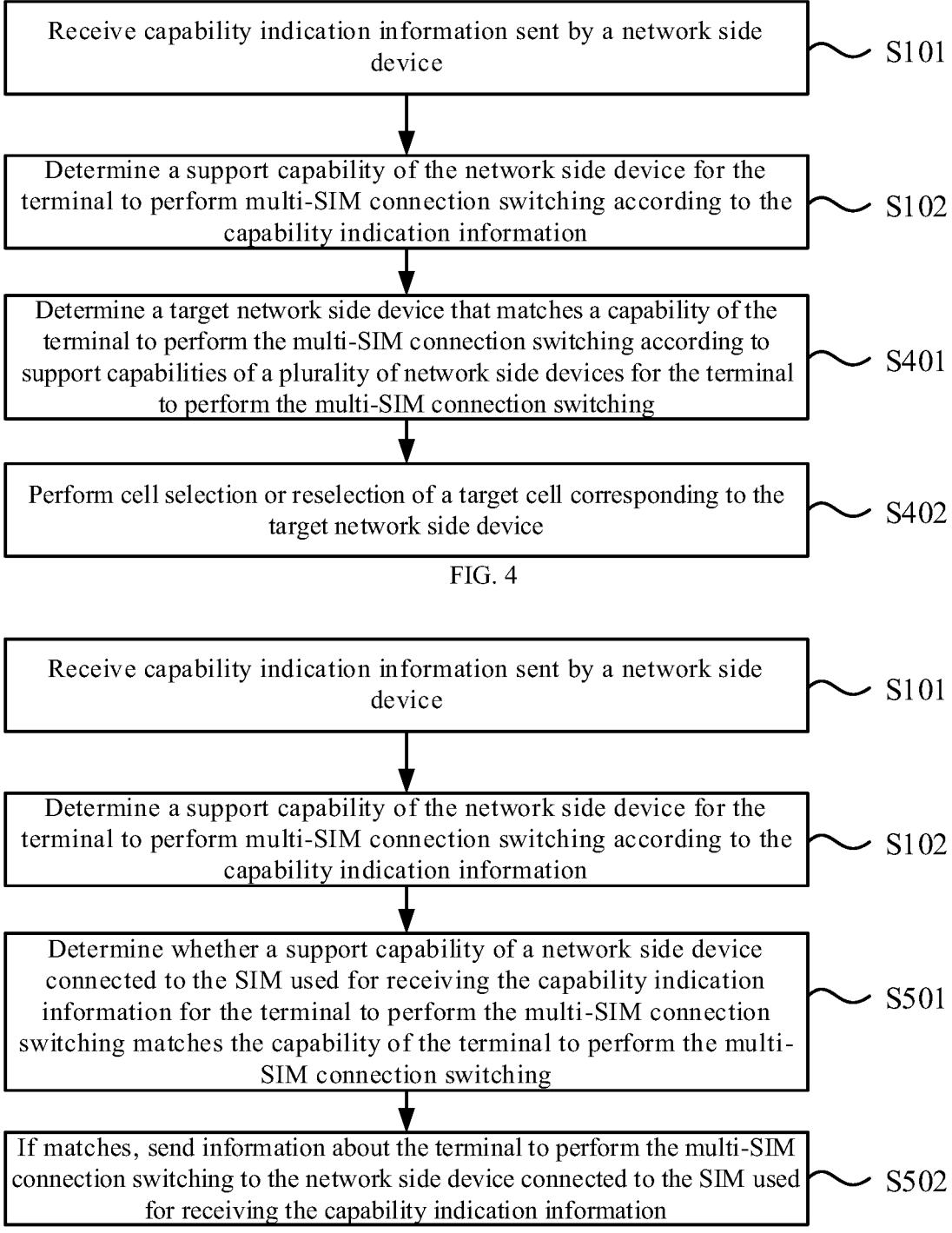

Receive capability indication information sent by a network side device ~ S101

Determine a support capability of the network side device for the terminal to perform multi-SIM connection switching according to the capability indication information ~ S102

Determine a target network side device that matches a capability of the terminal to perform the multi-SIM connection switching according to support capabilities of a plurality of network side devices for the terminal to perform the multi-SIM connection switching ~ S401

Perform cell selection or reselection of a target cell corresponding to the target network side device ~ S402

FIG. 4

Receive capability indication information sent by a network side device ~ S101

Determine a support capability of the network side device for the terminal to perform multi-SIM connection switching according to the capability indication information ~ S102

Determine whether a support capability of a network side device connected to the SIM used for receiving the capability indication information for the terminal to perform the multi-SIM connection switching matches the capability of the terminal to perform the multi-SIM connection switching ~ S501

If matches, send information about the terminal to perform the multi-SIM connection switching to the network side device connected to the SIM used for receiving the capability indication information ~ S502

FIG. 5

Send capability indication information to a terminal, where the capability indication information is used for indicating a support capability of the network side device for the terminal to perform multi-SIM connection switching ⌐∿ S601

FIG. 6

Send the capability indication information to the terminal when a request of the terminal to acquire the capability indication information is received ⌐∿ S701

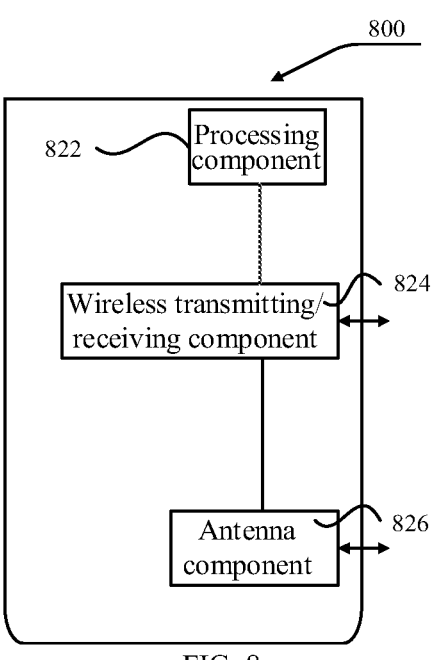

822 Processing component

824 Wireless transmitting/receiving component

826 Antenna component

FIG. 8

CAPABILITY DETERMINATION METHOD AND APPARATUS, CAPABILITY INDICATION METHOD AND APPARATUS, COMMUNICATION APPARATUS AND STORAGE MEDIUM

CROSS-REFERENCE TO RELATED APPLICATION

The present application is a U.S. National Stage of International Application No. PCT/CN2021/117043, filed on Sep. 7, 2021, the contents of which are incorporated herein by reference in their entirety.

TECHNICAL FIELD

The present disclosure relates to the field of communication technologies, and in particular, to capability determination methods, capability indication methods, capability determination apparatuses, capability indication apparatuses, communication apparatuses and computer-readable storage media.

BACKGROUND

In a multiple subscriber identity module (multi-SIM) terminal, a plurality of subscriber identity modules (SIMs) can be set up, and the terminal can communicate via the plurality of SIMs, for example, SIM #1 and SIM #2 are set up in the terminal, and the terminal can use SIM #1 to perform communication operations or SIM #2 to perform communication operations.

However, in some scenarios, there are situations where the terminal needs to use SIM #2 for communication when it is using SIM #1 for communication, which requires the terminal to perform multi-SIM connection switching from, e.g., switching using SIM #1 for communication to using SIM #2 for communication.

SUMMARY

In view of this, embodiments of the present disclosure propose capability determination methods, capability indication methods, capability determination apparatuses, capability indication apparatuses, communication apparatuses and computer-readable storage media to solve technical problems in related technologies.

According to a first aspect of an embodiment of the present disclosure, a capability determination method is provided, which is performed by a terminal, and the method includes: receiving capability indication information sent by a network side device; and determining, according to the capability indication information, a support capability of the network side device for the terminal to perform multi-SIM connection switching.

According to a second aspect of an embodiment of the present disclosure, a capability indication method is provided, which is performed by a network side device, and the method includes: sending capability indication information to a terminal, where the capability indication information is used for indicating a support capability of the network side device for the terminal to perform multi-SIM connection switching.

According to a third aspect of an embodiment of the present disclosure, a capability determination apparatus is provided, including one or more processors, the one or more processors being configured to perform: receiving capability indication information sent by a network side device; and determining, according to the capability indication information, a support capability of the network side device for a terminal to perform multi-SIM connection switching.

BRIEF DESCRIPTION OF DRAWINGS

In order to more clearly illustrate technical solutions in embodiments of the present disclosure, a brief introduction will be given below to the accompanying drawings required in the description of the embodiments. It is evident that the accompanying drawings in the following description are only some embodiments of the present disclosure. For those of ordinary skill in the art, other accompanying drawings can be obtained based on these accompanying drawings without paying creative labor.

FIG. 1 is a schematic flowchart of a capability determination method illustrated according to an embodiment of the present disclosure.

FIG. 2 is a schematic flowchart of another capability determination method illustrated according to an embodiment of the present disclosure.

FIG. 3 is a schematic flowchart of yet another capability determination method illustrated according to an embodiment of the present disclosure.

FIG. 4 is a schematic flowchart of yet another capability determination method illustrated according to an embodiment of the present disclosure.

FIG. 5 is a schematic flowchart of yet another capability determination method illustrated according to an embodiment of the present disclosure.

FIG. 6 is a schematic flowchart of a capability indication method illustrated according to an embodiment of the present disclosure.

FIG. 7 is a schematic flowchart of another capability indication method illustrated according to an embodiment of the present disclosure.

FIG. 8 is a schematic block diagram of an apparatus for capability indication illustrated according to an embodiment of the present disclosure.

DETAILED DESCRIPTION

Figure 9:
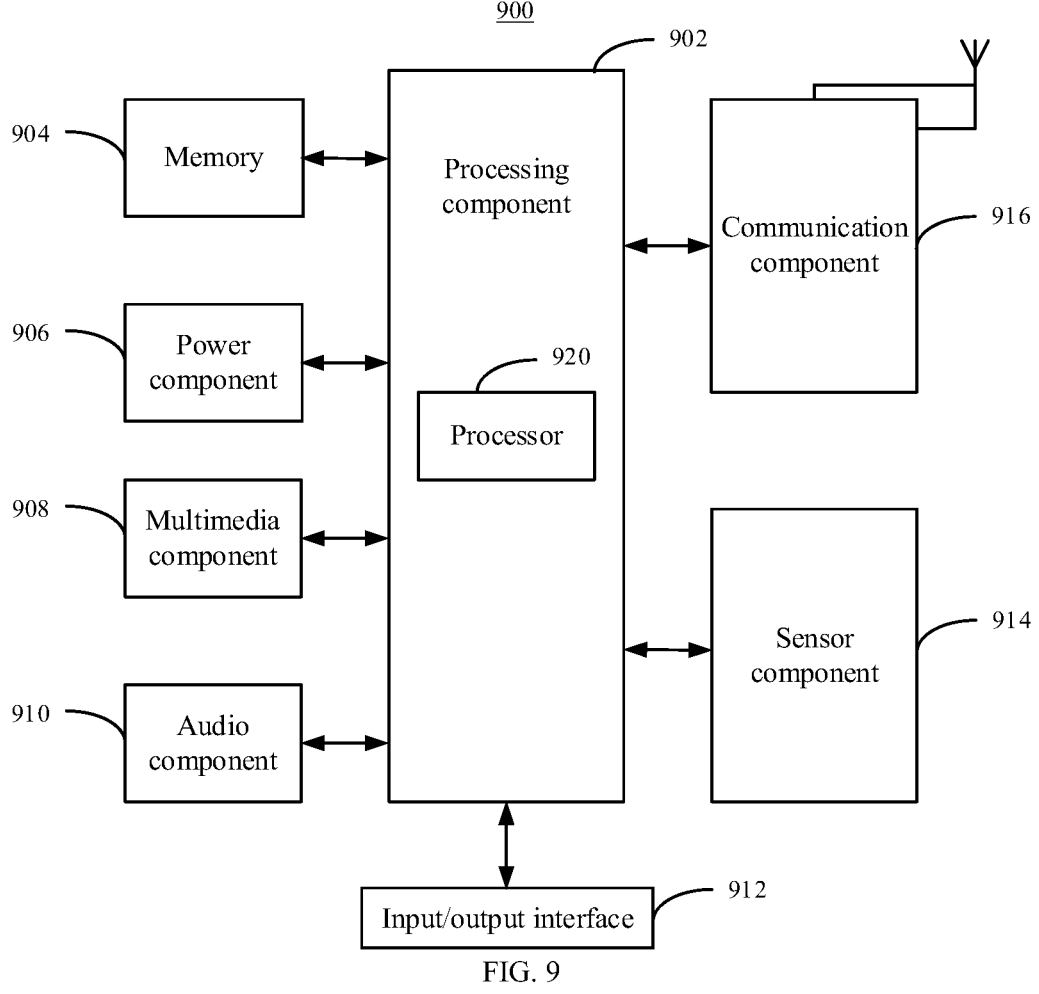
FIG. 9 is a schematic block diagram of an apparatus for capability determination illustrated according to an embodiment of the present disclosure.

The technical solutions in the embodiments of the present disclosure will be clearly and completely described below in conjunction with the accompanying drawings in the embodiments of the present disclosure. Obviously, the described embodiments are only a part of the embodiments of the present disclosure, not the whole embodiments. Based on the embodiments in the present disclosure, all other embodiments obtained by those of ordinary skills in the art without making creative efforts belong to the protection scope of the present disclosure.

Terms used in embodiments of the present disclosure are only for a purpose of describing specific embodiments, and are not limiting the embodiments of the present disclosure. Singular forms of "a", said", and "the" used in the embodiments of the present disclosure and in the claims are also intended to include majority forms, unless the context clearly indicates otherwise. It should also be understood that the term "and/or" as used herein refers to any or all of the possible combinations containing one or more of the listed items in association.

It should be understood that although terms first, second, third, etc. may be used to describe various information in the embodiments of the present disclosure, the information should not be limited to these terms. These terms are used only to distinguish the same type of information from one another. For example, without departing from the scope of the present disclosure, first SIM can also be called second SIM, and similarly, the second SIM can also be called the first SIM. Depending on the context, the word "if" as used herein can be interpreted as "at" or "when" or "in response to determining".

For the purpose of simplicity and ease of understanding, the terms used in the present disclosure to represent size relationships are "greater than" or "less than", "higher than" or "lower than". But for those skilled in the art, it can be understood that the term "greater than" also covers the meaning of "greater than or equal to" and "less than" also covers the meaning of "less than or equal to". The term "higher than" covers the meaning of "higher than or equal to" and "lower than" also covers the meaning of "lower than or equal to".

FIG. 1 is a schematic flowchart of a capability determination method illustrated according to an embodiment of the present disclosure. The capability determination method shown in this embodiment can be performed by a terminal, including but not limited to a communication apparatus such as a cell phone, a tablet computer, a wearable device, a sensor, an IoT device, and the like. The terminal can be used as user equipment to communicate with a network side device, including but is not limited to a network side device in a communication system such as 4G, 5G, 6G, etc., and the network side device may be a base station, a core network, and the like.

In an embodiment, the terminal may be provided with a plurality of SIMs, either a conventional SIM or an eSIM, i.e., an embedded SIM.

Hereinafter, the technical solution of the present disclosure will be exemplified mainly in case that the plurality of SIMs include a first SIM and a second SIM. The first SIM and the second SIM do not specifically refer to a certain SIM, but are used to represent any two different SIMs among a plurality of SIMs. The first SIM and the second SIM can belong to a same operator or different operators, and can be selected as required.

As shown in FIG. 1, the capability determination method may include the steps S101 and S102.

At step S101, capability indication information sent by a network side device is received.

At step S102, a support capability of the network side device for the terminal to perform multi-SIM connection switching is determined according to the capability indication information.

In an embodiment, the terminal is provided with a plurality of SIMs and the plurality of SIMs at least include a first SIM and a second SIM. The multi-SIM connection switching includes switching to the second SIM for communication operation when the communication operation is performed through the first SIM (in this case, the communication operation performed by the first SIM can be interrupted). It should be noted that the multi-SIM connection switching is not limited to the included embodiment, for example, it may further include enabling the second SIM to perform the communication operation at the same time when the communication operation is performed through the first SIM (in this case, the communication operation performed by the first SIM can be uninterrupted). In the following, the technical solution of the present disclosure will be exemplified mainly for the case that the multi-SIM connection switching includes switching to the second SIM for the communication operation when the communication operation is performed through the first SIM.

For this situation, it is necessary for the network side device to make appropriate operation and configuration for the terminal. Taking the network side device including a base station as an example, for example, when a terminal communicates with a first base station via a first SIM, the terminal may need to communicate with a second base station via a second SIM, for example, receiving system information sent by the second base station, then the communication operation between the first base station and the first SIM needs to be interrupted for a certain period of time, and the first base station resumes the communication operation with the first SIM after the communication with the second base station via the second SIM is completed.

However, not all network side devices support resuming the communication operation of the first SIM after interruption. For example, base station(s) can make appropriate operation and configuration for the situation that the terminal performs the multi-SIM connection switching, e.g., support multi-SIM connection switching, while others cannot, e.g., do not support multi-SIM connection switching. Moreover, for the network side devices that support the multi-SIM connection switching, specific support situations for multi-SIM connection switching may also be different. For example, a base station may support multi-SIM connection switching when the first SIM leaves the connected state or support multi-SIM connection switching when the first SIM remains in the connected state.

In view of the above technical problems, in the embodiments of the present disclosure, the network side device can send the capability indication information to the terminal, and after the terminal receives the capability indication information, it can determine the support capability of the network side device for the terminal to perform the multi-SIM connection switching according to the capability indication information. For example, the terminal can determine whether the network side device supports the multi-SIM connection switching. For example, in the case of supporting the multi-SIM connection switching, the terminal can determine under which condition the network side device specifically supports the multi-SIM connection switching. In this way, the terminal can reasonably determine whether to inform the base station of the information of multi-SIM connection switching during subsequent multi-SIM connection switching.

In an embodiment, the support capability includes whether the network side device supports the terminal to perform the multi-SIM connection switching in case that a first condition is satisfied, where the first condition includes at least one of: the first SIM leaves a connected state; or the first SIM remains in the connected state.

In an embodiment, the network side device may support the terminal to perform a multi-SIM connection switching in case that the first SIM is not in the connected state.

For example, when the terminal performs communication operation via the first SIM, it needs to switch to the second SIM for communication operation. The terminal can switch to the second SIM for communication operation when the first SIM leaves the connected state, and the terminal may further switch back to the first SIM (for example, the first SIM returns to the connected state) after completing the communication operation via the second SIM.

In view of this situation, the network side device can perform appropriate operation and configuration, for example, the network side device can indicate the first SIM to enter a non-connected state (such as an idle state and an inactive state) when the terminal performs communication operation via the second SIM, indicate the first SIM to enter a connected state after the terminal completes the communication operation via the second SIM, and the network side device may further not configure a time-frequency resource for the first SIM when the terminal performs the communication operation via the second SIM.

In an embodiment, the network side device may support the terminal to perform multi-SIM connection switching in case that the first SIM remains in the connected state.

For example, when the terminal performs communication operation via the first SIM, it needs to switch to the second SIM for communication operation. The terminal can switch to the second SIM for communication operation when the first SIM remains in the connected state, but the first SIM suspends communication with the first base station when performing communication operation via the second SIM.

In view of this situation, the network side device can perform appropriate operation and configuration, for example, the network side device can suspend communication with the first SIM when the terminal performs communication operation via the second SIM, and continue to communicate with the first SIM after the terminal completes the communication operation via the second SIM.

Thus, the specific support situation for multi-SIM connection switching varies from terminal to terminal, and the capability of multi-SIM connection switching varies.

In an embodiment, the terminal can report the capability of performing multi-SIM connection switching to the network side device, so that the network side device can determine a specific support situation of the terminal for the multi-SIM connection switching accordingly, and then make appropriate configuration for the terminal, which is beneficial to efficient utilization of communication resources.

For example, if the network side device determines, according to the capability information reported by the terminal, that the terminal supports switching to the second SIM for communication operation when the first SIM leaves the connected state and does not support switching to the second SIM for communication operation when the first SIM remains in the connected state, a configuration of the first SIM for communication operation can be determined according to a configuration of the second SIM for communication operation.

For example, it can be determined that time domain resources occupied by the second SIM for communication operation are t1 to t2. When configuring time domain resources for communication operation performed by the first SIM, time domain resources other than t1 to t2 can be configured, so as to prevent the terminal from performing communication during switching from the first SIM to the second SIM at a period between t1 and t2, resulting in a waste of resources configured for the first SIM during this period.

For example, if the network side device determines, according to the capability information reported by the terminal, that the terminal supports switching to the second SIM for communication operation when the first SIM remains in the connected state, a context of the first SIM for communication operation can still be retained when it is determined that the terminal uses the second SIM for communication operation, so as to quickly resume communication with the first SIM. Thus, it is also possible to delete the context of the first SIM for communication operation to reduce an occupation of a storage space of the network side device.

In an embodiment, the first SIM leaving the connected state includes the first SIM leaving the connected state based on an access stratum; and/or the first SIM leaving the connected state based on the non-access stratum.

The first SIM leaving the connected state can be according to an instruction of access stratum signaling (such as leaving the connected state according to signaling sent by the base station), or it can be leaving the connected state according to signaling sent by the non-access stratum (such as leaving the connected state according to signaling sent by the core network).

In an embodiment, the first SIM remaining in the connected state includes the first SIM remaining in the connected state based on an access stratum; and/or the first SIM remaining in the connected state based on the non-access stratum.

The first SIM remaining in the connected state can be according to an instruction of access stratum signaling (such as remaining in the connected state according to signaling sent by the base station), or it can be remaining in the connected state according to signaling sent by the non-access stratum (such as remaining in the connected state according to signaling sent by a core network).

FIG. 2 is a schematic flowchart of another capability determination method illustrated according to an embodiment of the present disclosure. As shown in FIG. 2, the method shown in FIG. 1 further includes step S201.

At step S201, an acquisition request is sent to the network side device, where the acquisition request is used for requesting the network side device to send the capability indication information.

In an embodiment, the capability indication information sent by the network side device can be automatically sent, e.g., periodically sent, or only sent when requested by the terminal. For example, for an NR system, it can be sent through on-demand SI. When the terminal needs to acquire the capability indication information, it can send an acquisition request to the network side device. The network side device can send the capability indication information after receiving the acquisition request.

In an embodiment, the capability indication information is carried in at least one of: system information (SI); or radio resource control (RRC) signaling.

The network side device can send the capability indication information by broadcasting, e.g., carrying the capability indication information in the SI for broadcasting, for example, periodic broadcasting, or broadcasting after receiving the acquisition request sent by the terminal. The network side device can also send the capability indication information by unicast, e.g., carrying the capability indication information in RRC signaling and sending it to the terminal. For example, the capability indication information can be sent to the terminal in advance, or it can be sent to the terminal after receiving a request of the terminal.

FIG. 3 is a schematic flowchart of yet another capability determination method illustrated according to an embodiment of the present disclosure. As shown in FIG. 3, the capability indication information is carried in a system information block (SIB) of the SI, receiving the capability indication information sent by the network side device includesS102 and steps S301 and S302.

At step S301, minimum SI sent by the network side device is read.

At step S302, the SIB is read according to the minimum SI.

In an embodiment, the network side device may carry information about the SIB in the minimum SI, for example, the information in the minimum SI may indicate whether there is an SIB carrying the capability indication information in currently broadcast SI, and may further indicate scheduling information of the SIB carrying the capability indication information. Accordingly, the terminal can determine whether the SIB carrying the capability indication information can be acquired from the SI, and further can acquire the SIB carrying the capability indication information according to the scheduling information.

In an embodiment, the minimum SI sent by the network side device is read in case that a second condition is satisfied, and the second condition at least includes one of the following: the terminal having a plurality of SIM slots, where at least two SIM slots have been inserted with SIMs; the terminal having a plurality of SIM slots, where at least two SIM slots have been inserted with SIMs, and at least two SIMs are in an active state; the terminal having a plurality of SIM slots, where at least two SIM slots have been inserted with SIMs, and a second SIM is required to be used for communication operation in case that the first SIM is in the connected state; or the terminal supporting the multi-SIM connection switching.

In an embodiment, since the minimum SI can be used to indicate whether there is an SIB carrying the capability indication information in the currently broadcast SI, and further indicate the scheduling information of the SIB carrying the capability indication information, the terminal can be set to read the minimum SI only when it is to acquire the capability indication information.

For example, the terminal can be set to read the minimum SI only when there are multiple card slots (SIM slots) and at least two of the SIM slots have been inserted with SIMs. In this case, the terminal may use at least two SIMs for communication, so it is possible to perform multi-SIM connection switching, so the terminal can be set to read the minimum SI to acquire the capability indication information.

For example, the terminal can be set to read the minimum SI only when there are multiple SIM slots, at least two of the SIM slots have been inserted SIMs, and at least two SIMs are in the active/enabled state. In this case, the terminal is more likely to use at least two SIMs for communication, so it is possible to perform multi-SIM connection switching, so the terminal can be set to read the minimum SI to acquire the capability indication information.

For example, the terminal can be set to read the minimum SI only when there are multiple SIM slots, at least two of the SIM slots have been inserted SIMs, and when a first SIM is in the connected state, a second SIM is required to be used for communication operation. In this case, the terminal will use at least two SIMs for communication, so it is more likely to perform multi-SIM connection switching, so the terminal can be set to read the minimum SI to acquire the capability indication information.

For example, it is possible to set the terminal to read the minimum SI when it supports multi-SIM connection switching. In this case, the terminal is capable of switching to the second SIM for communication operation under the condition that the first SIM is in the connected state, so it is possible to report the information of the terminal's multi-SIM connection switching to the network side device under the condition that the network side device also supports multi-SIM connection switching. Therefore, it is necessary to determine a support situation of the network side device for multi-SIM connection switching according to the capability indication information, so the terminal can be set to read the minimum SI to acquire the capability indication information.

In an embodiment, reading the SIB according to the minimum SI includes: in case that it is determined the network side device broadcasting the SIB according to the minimum SI, and the capability information carried by the SIB is used to indicate that the network side device supports the terminal to perform the multi-SIM connection switching, reading the SIB according to scheduling information in the minimum SI.

In an embodiment, reading the SIB according to the minimum SI includes: in case that it is determined the network side device not broadcasting the SIB according to the minimum SI, the SIB is stored in the network side device, and the capability information carried by the SIB is used to indicate that the network side device supports the terminal to perform the multi-SIM connection switching, sending a request to the network side device for acquiring the SIB.

In an embodiment, the minimum SI may indicate whether the network side device is broadcasting the SIB carrying the capability indication information, and whether the capability information carried by the SIB indicates that the network side device supports the terminal to perform the multi-SIM connection switching or does not support the terminal to perform the multi-SIM connection switching. Under the condition that the network side device is broadcasting the SIB, the minimum SI can further carry scheduling information of the SIB.

When the terminal determines that the network side device is broadcasting the SIB according to the minimum SI, and the capability information carried by the SIB is used to indicate that the network side device supports the terminal to perform the multi-SIM connection switching. The scheduling information of the SIB can be further acquired from the minimum SI, and the SIB can be read according to the scheduling information, e.g., the scheduling information can indicate time-frequency resources of the SIB, and the terminal can receive the SIB at the time-frequency resources.

When the terminal determines that the network side device is not broadcasting the SIB according to the minimum SI, the SIB is stored in the network side device, and the capability information carried by the SIB is used to indicate that the network side device supports the terminal to perform multi-SIM connection switching, the terminal can send a request to the network side device to request the network side device to send the SIB. Accordingly, the network side device can broadcast the SIB, or the network side device can carry the capability indication information in RRC signaling, and send it to the terminal.

FIG. 4 is a schematic flowchart of yet another capability determination method illustrated according to an embodiment of the present disclosure. As shown in FIG. 4, a SIM used for receiving the capability indication information in the terminal is in a non-connected state, and the method of FIG. 1 further includes steps S401 and S402.

At step S401, a target network side device that matches the capability of the terminal to perform the multi-SIM connection switching is determined according to support capabilities of a plurality of network side devices for the terminal to perform the multi-SIM connection switching.

At step S402, cell selection or cell reselection of a target cell corresponding to the target network side device is performed.

In an embodiment, for example, the terminal receives the capability indication information sent by the network side device via the first SIM, and the first SIM may be in the non-connected state, for example, in the inactive state or the idle state.

The first SIM can receive broadcast information sent by a plurality of network side devices, and each network side device can carry its own capability indication information in the broadcast information, so that the terminal can determine support capabilities of the plurality of network side devices for the multi-SIM connection switching of the terminal. Then a target network side device matching the capability of the terminal to perform the multi-SIM connection switching can be determined among the plurality of network side devices.

The terminal may first determine the capability of multi-SIM connection switching supported by itself, for example, supporting multi-SIM connection switching under the condition of meeting a target condition, where the target condition may be the same as or different from the first condition in the above embodiments. Furthermore, among the plurality of network side devices, a network side device that also supports the terminal to perform multi-SIM connection switching under the condition of meeting the target condition can be determined as the target network side device.

For the target network side device, because the target network side device supports the terminal to perform multi-SIM connection switching under the condition of meeting the target conditions, e.g., the target network side device can make appropriate configuration for the terminal to perform the multi-SIM connection switching under the condition of meeting the target condition, the terminal can perform cell selection or cell reselection to the target cell corresponding to the target network side device. In this way, the terminal can access the target network side device, and then report the information of the multi-SIM connection switching to the target network side device, so that the target network side device can make appropriate configurations with respect to the operation of the terminal to perform the multi-SIM connection switching.

In an embodiment, the information about the multi-SIM connection switching reported by the terminal includes at least one of the following: information about the second SIM to be switched during a process of the terminal performing multi-SIM connection switching, such as an identification of the second SIM; or information about communication operation performed after switching to the second SIM, such as a type of the communication operation performed after switching to the second SIM, a duration of the communication operation, etc.

In an embodiment, after receiving the information about multi-SIM connection switching, the network side device can make appropriate configuration for the process of multi-SIM connection switching performed by the terminal. For example, the information about multi-SIM connection switching includes a second type of communication operation to be performed when switching to the second SIM. Since a first type of communication operation being performed by the first SIM is known to the network side device, the network side device, after determining the second type, can make an appropriate configuration for the process of the terminal performing the multi-SIM connection switching based on the first type and the second type.

For example, if a priority of the first type is higher than a priority of the second type, the network side device can configure the terminal not to switch to the second SIM for communication, and if the priority of the second type is higher than the first type, the network side device can configure the terminal to switch to the second SIM for communication.

The first type and the second type can refer to service types, and the priorities corresponding to the service types can be related to delays allowed by the service types, e.g. the lower the delay allowed, the higher the priority.

In addition to the way of configuring the process of the terminal performing the multi-SIM connection switching mentioned above, other ways can also be considered. For example, delays allowed by the first type and the second type can be considered. For example, if a delay allowed by the first type is relatively large, such as greater than a delay threshold, the network side device can be configured to allow the terminal to switch to the second SIM for communication. For example, if the delay allowed by the first type is relatively small, such as less than the delay threshold, the network side device can be configured not to allow the terminal to switch to the second SIM.

FIG. 5 is a schematic flowchart of yet another capability determination method illustrated according to an embodiment of the present disclosure. As shown in FIG. 5, a SIM used for receiving the capability indication information in the terminal is in a connected state, and the method of FIG. 1 further includes steps S501 and S502.

At step S501, it is determined whether a support capability of a network side device connected to the SIM used for receiving the capability indication information for the terminal to perform the multi-SIM connection switching matches the capability of the terminal to perform the multi-SIM connection switching.

At step S502, in case that the support capability of the network side device connected to the SIM used for receiving the capability indication information for the terminal to perform the multi-SIM connection switching matches the capability of the terminal to perform the multi-SIM connection switching, information about the terminal to perform the multi-SIM connection switching is sent to the network side device connected to the SIM used for receiving the capability indication information.

In an embodiment, for example, the terminal receives the capability indication information sent by the network side device via the first SIM, and the first SIM may be in the connected state.

The terminal can determine whether a support capability of a network side device for the terminal to perform multi-SIM connection switching matches the capability of the terminal to perform the multi-SIM connection switching, where the network side device connected to the SIM used for receiving the capability indication information. For example, the network side device can send the capability indication information to the first SIM through RRC signaling.

The terminal may first determine the capability of multi-SIM connection switching supported by itself, for example, supporting multi-SIM connection switching under the condition of meeting a target condition, where the target condition may be the same as or different from the first condition in the above embodiments. Furthermore, according to the capability indication information sent by the network side device connected to the SIM for receiving the capability indication information, the terminal can determine whether the network side device supports the terminal to perform the multi-SIM connection switching under the condition of meeting the target condition, and if so, a match can be determined.

For the matched network side device, because the network side device supports the terminal to perform the multi-SIM connection switching under the condition of meeting the target conditions, e.g., the matched network side device can make appropriate configuration for the terminal to perform the multi-SIM connection switching under the condition of meeting the target condition, the terminal can report the information about the multi-SIM connection switching to the network side device, so that the network side device can make appropriate configurations with respect to the operation of the terminal to perform the multi-SIM connection switching.

In an embodiment, the information about the multi-SIM connection switching reported by the terminal includes at least one of the following: information about the second SIM to be switched during a process of the terminal performing multi-SIM connection switching, such as an identification of the second SIM; or information about communication operation performed after switching to the second SIM, such as a type of the communication operation performed after switching to the second SIM, a duration of the communication operation, etc. The terminal reports the information about the multi-SIM connection switching, which may be reported when the terminal is about to perform the multi-SIM connection switching or during a process of performing the multi-SIM connection switching.

FIG. 6 is a schematic flowchart of a capability indication method illustrated according to an embodiment of the present disclosure. The capability determination method shown in this embodiment can be performed by a network side device, the network side device includes but is not limited to a network side device in a communication system such as 4G, 5G, 6G, etc., and the network side device may be a base station and a core network, the network side device may be in communication with a terminal, the terminal including but not limited to a communication apparatus such as a cell phone, a tablet computer, a wearable device, a sensor, an IoT device, etc.

In an embodiment, the terminal may be provided with a plurality of SIMs, either a conventional SIM or an eSIM, i.e., an embedded SIM.

Hereinafter, the technical solution of the present disclosure will be exemplified mainly in case that the plurality of SIMs include a first SIM and a second SIM. The first SIM and the second SIM do not specifically refer to a certain SIM, but are used to represent any two different SIMs among a plurality of SIMs. The first SIM and the second SIM can belong to a same operator or different operators, and can be selected as required.

As shown in FIG. 6, the capability indication method may include step S601. At step S601, capability indication information is sent to a terminal, where the capability indication information is used for indicating a support capability of the network side device for the terminal to perform multi-SIM connection switching.

In an embodiment, the terminal is provided with a plurality of SIMs, and the plurality of SIMs at least include a first SIM and a second SIM, the multi-SIM connection switching includes switching to the second SIM for communication operation when the communication operation is performed through the first SIM (in this case, the communication operation performed by the first SIM can be interrupted). It should be noted that the multi-SIM connection switching is not limited to the above situation, for example, it may further include enabling the second SIM to perform the communication operation at the same time when the communication operation is performed through the first SIM (in this case, the communication operation performed by the first SIM can be uninterrupted). In the following, the technical solution of the present disclosure will be exemplified mainly for the case that the multi-SIM connection switching includes switching to the second SIM for communication operation when the communication operation is performed through the first SIM.

For this situation, it is necessary for the network side device to make appropriate operation and configuration for the terminal. Taking the network side device including a base station as an example, for example, when a terminal communicates with a first base station via a first SIM, the terminal may need to communicate with a second base station via a second SIM, for example, receiving system information sent by the second base station, then the communication operation between the first base station and the first SIM needs to be interrupted for a certain period of time, and the first base station resumes the communication operation with the first SIM after the communication with the second base station via the second SIM is completed.

However, not all base stations support resuming the communication operation of the first SIM after interruption. Network side device(s) can make appropriate operation and configuration for the situation that the terminal performs the multi-SIM connection switching, e.g., support multi-SIM connection switching, while others cannot, e.g., do not support multi-SIM connection switching. Moreover, for the network side devices that support the multi-SIM connection switching, specific support situations for multi-SIM connection switching can also be different. For example, a base station may support multi-SIM connection switching when the first SIM leaves the connected state or support multi-SIM connection switching when the first SIM remains in the connected state.

In view of the disclosed technical problems, in the embodiments of the present disclosure, the network side device can send the capability indication information to the terminal, and after the terminal receives the capability indication information, it can determine the support capability of the network side device for the terminal to perform the multi-SIM connection switching according to the capability indication information. For example, the terminal can determine whether the network side device supports multi-SIM connection switching. For example, in the case of supporting multi-SIM connection switching, the terminal can determine under which condition the network side device specifically supports the multi-SIM connection switching. In this way, the terminal can reasonably determine whether to inform the base station of the information of multi-SIM connection switching during subsequent multi-SIM connection switching.

In an embodiment, the support capability includes whether the network side device supports the terminal to perform the multi-SIM connection switching in case that a first condition is satisfied, where the first condition includes at least one of: the first SIM leaves a connected state; or the first SIM remains in the connected state.

In an embodiment, the network side device may support the terminal to perform a multi-SIM connection switching in case that the first SIM is not in the connected state.

For example, when the terminal performs communication operation via the first SIM, it needs to switch to the second SIM for communication operation. The terminal can switch to the second SIM for communication operation when the first SIM leaves the connected state, and the terminal may further switch back to the first SIM (for example, the first SIM returns to the connected state) after completing the communication operation via the second SIM.

In view of this situation, the network side device can perform appropriate operation and configuration, for example, the network side device can indicate the first SIM to enter a non-connected state (such as an idle state and an inactive state) when the terminal performs communication operation via the second SIM, indicate the first SIM to enter a connected state after the terminal completes the communication operation via the second SIM, and the network side device may further not configure a time-frequency resource for the first SIM when the terminal performs the communication operation via the second SIM.

In an embodiment, the network side device may support the terminal to perform multi-SIM connection switching in case that the first SIM remains in the connected state.

For example, when the terminal performs communication operation via the first SIM, it needs to switch to the second SIM for communication operation. The terminal can switch to the second SIM for communication operation when the first SIM remains in the connected state, but the first SIM suspends communication with the first base station when performing communication operation via the second SIM.

In view of this situation, the network side device can perform appropriate operation and configuration, for example, the network side device can suspend communication with the first SIM when the terminal performs communication operation via the second SIM, and continue to communicate with the first SIM after the terminal completes the communication operation via the second SIM.

It can be seen that the specific support situation for multi-SIM connection switching varies from terminal to terminal, and the capability of multi-SIM connection switching varies.

In an embodiment, the terminal can report the capability of performing multi-SIM connection switching to the network side device, so that the network side device can determine a specific support situation of the terminal for the multi-SIM connection switching accordingly, and then make appropriate configuration for the terminal, which is beneficial to efficient utilization of communication resources.

For example, if the network side device determines, according to the capability information reported by the terminal, that the terminal supports switching to the second SIM for communication operation when the first SIM leaves the connected state and does not support switching to the second SIM for communication operation when the first SIM remains in the connected state, a configuration of the first SIM for communication operation can be determined according to a configuration of the second SIM for communication operation.

For example, it can be determined that time domain resources occupied by the second SIM for communication operation are t1 to t2. When configuring time domain resources for communication operation performed by the first SIM, time domain resources other than t1 to t2 can be configured, so as to prevent the terminal from performing communication during switching from the first SIM to the second SIM at a period between t1 and t2, resulting in a waste of resources configured for the first SIM during this period. For example, if the network side device determines, according to the capability information reported by the terminal, that the terminal supports switching to the second SIM for communication operation when the first SIM remains in the connected state, a context of the first SIM for communication operation can still be retained when it is determined that the terminal uses the second SIM for communication operation, so as to quickly resume communication with the first SIM. It should be understood that the context of the first SIM for communication operation also further be deleted to reduce an occupation of a storage space of the network side device.

In an embodiment, the first SIM leaving the connected state includes the first SIM leaving the connected state based on an access stratum; and/or the first SIM leaving the connected state based on the non-access stratum.

The first SIM leaving the connected state can be according to an instruction of access stratum signaling (such as leaving the connected state according to signaling sent by the base station), or it can be leaving the connected state according to signaling sent by the non-access stratum (such as leaving the connected state according to signaling sent by the core network).

In an embodiment, the first SIM leaving the connected state includes the first SIM leaving the connected state based on an access stratum; and/or the first SIM leaving the connected state based on the non-access stratum.

The first SIM leaving the connected state can be according to an instruction of access stratum signaling (such as leaving the connected state according to signaling sent by the base station), or it can be leaving the connected state according to signaling sent by the non-access stratum (such as leaving the connected state according to signaling sent by a core network).

In an embodiment, the first SIM remaining in the connected state includes the first SIM remaining in the connected state based on an access stratum; and/or the first SIM remaining in the connected state based on the non-access stratum.

The first SIM remaining in the connected state can be according to an instruction of access stratum signaling (such as remaining in the connected state according to signaling sent by the base station), or it can be remaining in the connected state according to signaling sent by the non-access stratum (such as remaining in the connected state according to signaling sent by a core network).

In an embodiment, the capability indication information is carried in a system information block (SIB).

In an embodiment, the network side device includes a new radio (NR) network side device, and the SIB includes an SIB carried in on-demand system information (SI).

In an embodiment, the capability indication information is carried in radio resource control (RRC) signaling.

The network side device can send the capability indication information by broadcasting, e.g., carrying the capability indication information in the SI for broadcasting, specifically, carrying the capability indication information in the SIB for broadcasting, for example, periodic broadcasting, or broadcasting after receiving the acquisition request sent by the terminal. For an NR network side device, the SIB broadcasted after receiving the acquisition request can be an SIB in on-demand SI.

The network side device can also send the capability indication information by unicast, e.g., carrying the capability indication information in RRC signaling and sending it to the terminal. For example, the capability indication information can be sent to the terminal in advance, or it can be sent to the terminal after receiving a request of the terminal.

FIG. 7 is a schematic flowchart of another capability indication method illustrated according to an embodiment of the present disclosure. As shown in FIG. 7, sending the capability indication information to the terminal includes step S701.

At step S701, the capability indication information is sent to the terminal when a request of the terminal to acquire the capability indication information is received.

In an embodiment, the capability indication information sent by the network side device can be automatically sent, e.g., periodically sent, or only sent when requested by the terminal, e.g., on-demand SI. When the terminal needs to acquire the capability indication information, it can send an acquisition request to the network side device. The network side device can send the capability indication information after receiving the acquisition request.

Corresponding to the above embodiments of the capability determination methods and the capability indication methods, the present disclosure further provides embodiments of capability determination apparatuses and capability indication apparatuses.

An embodiment of the present disclosure further provides a capability indication apparatus, which can be performed by a terminal, including but not limited to a communication apparatus such as a cell phone, a tablet computer, a wearable device, a sensor, an IoT device, and the like. The terminal can be used as user equipment to communicate with a network side device, including but is not limited to a network side device in a communication system such as 4G, 5G, 6G, etc., and the network side device may be a base station, a core network, and the like.

In an embodiment, the terminal may be provided with a plurality of SIMs, either a conventional SIM or an eSIM, i.e., an embedded SIM.

Hereinafter, the technical solution of the present disclosure will be exemplified mainly in case that the plurality of SIMs include a first SIM and a second SIM. The first SIM and the second SIM do not specifically refer to a certain SIM, but are used to represent any two different SIMs among a plurality of SIMs. The first SIM and the second SIM can belong to a same operator or different operators, and can be selected as required.

In an embodiment, the capability determination apparatus includes one or more processors, the one or more processors being configured to perform: receiving capability indication information sent by a network side device; and determining, according to the capability indication information, a support capability of the network side device for a terminal to perform multi-SIM connection switching.

In an embodiment, the terminal is provided with a plurality of subscriber identity modules (SIMs), and the plurality of SIMs at least include a first SIM and a second SIM, and the multi-SIM connection switching includes switching to the second SIM for communication operation when communication operation is performed through the first SIM.

In an embodiment, the support capability includes whether the network side device supports the terminal to perform the multi-SIM connection switching in case that a first condition is satisfied, where the first condition includes at least one of: the first SIM leaves a connected state; or the first SIM remains in the connected state.

In an embodiment, the first SIM leaving the connected state includes the first SIM leaving the connected state based on an access stratum; and/or the first SIM leaving the connected state based on the non-access stratum.

In an embodiment, the one or more processors are further configured to perform: sending an acquisition request to the network side device, where the acquisition request is used for requesting the network side device to send the capability indication information.

In an embodiment, the capability indication information is carried in at least one of: system information (SI); or radio resource control (RRC) signaling.

In an embodiment, the capability indication information is carried in a system information block (SIB) of the SI, the one or more processors are further configured to perform: reading minimum SI sent by the network side device; and reading the SIB according to the minimum SI.

In an embodiment, the minimum SI sent by the network side device is read in case that a second condition is satisfied, and the second condition includes at least one of: the terminal having a plurality of SIM slots, where at least two SIM slots have been inserted with SIMs; the terminal having a plurality of SIM slots, where at least two SIM slots have been inserted with SIMs, and at least two SIMs are in an active state; the terminal having a plurality of SIM slots, where at least two SIM slots have been inserted with SIMs, and a second SIM is required to be used for communication operation in case that the first SIM is in the connected state; or the terminal supporting the multi-SIM connection switching.

In an embodiment, the one or more processors are configured to perform: in case that the network side device broadcasting the SIB is determined according to the minimum SI, and the capability information carried by the SIB is used to indicate that the network side device supports the terminal to perform the multi-SIM connection switching, reading the SIB according to scheduling information in the minimum SI.

In an embodiment, the one or more processors are configured to perform: in case that the network side device not broadcasting the SIB is determined according to the minimum SI, the SIB is stored in the network side device, and the capability information carried by the SIB is used to indicate that the network side device supports the terminal to perform the multi-SIM connection switching, sending a request to the network side device for acquiring the SIB.

In an embodiment, a SIM used for receiving the capability indication information in the terminal is in a non-connected state, and the one or more processors are further configured to perform: determining a target network side device that matches a capability of the terminal to perform the multi-SIM connection switching according to support capabilities of a plurality of network side devices for the terminal to perform the multi-SIM connection switching; and performing cell selection or cell reselection of a target cell corresponding to the target network side device.

In an embodiment, a SIM used for receiving the capability indication information in the terminal is in a connected state, and the one or more processors are further configured to perform: determining whether a support capability of a network side device connected to the SIM used for receiving the capability indication information for the terminal to perform the multi-SIM connection switching matches the capability of the terminal to perform the multi-SIM connection switching; and in case that the support capability of the network side device connected to the SIM used for receiving the capability indication information for the terminal to perform the multi-SIM connection switching matches the capability of the terminal to perform the multi-SIM connection switching, sending information about the terminal to perform the multi-SIM connection switching to the network side device connected to the SIM used for receiving the capability indication information.

An embodiment of the present disclosure further provides a schematic block diagram of a capability indication apparatus. The capability determination apparatus can be performed by a network side device, the network side device includes but is not limited to a network side device in a communication system such as 4G, 5G, 6G, etc., and the network side device may be a base station and a core network, the network side device may be in communication with a terminal, the terminal including but not limited to a communication apparatus such as a cell phone, a tablet computer, a wearable device, a sensor, an IoT device, etc.

In an embodiment, the terminal may be provided with a plurality of SIMs, either a conventional SIM or an eSIM, i.e., an embedded SIM.

Hereinafter, the technical solution of the present disclosure will be exemplified mainly in case that the plurality of SIMs include a first SIM and a second SIM. The first SIM and the second SIM do not specifically refer to a certain SIM, but are used to represent any two different SIMs among a plurality of SIMs. The first SIM and the second SIM can belong to a same operator or different operators, and can be selected as required.

In an embodiment, the capability indication apparatus includes one or more processors, and the one or more processors being configured to perform: sending capability indication information to a terminal, where the capability indication information is used for indicating a support capability of a network side device for the terminal to perform multi-SIM connection switching.

In an embodiment, the terminal is provided with a plurality of subscriber identity modules (SIMs), the plurality of SIMs at least include a first SIM and a second SIM, and the multi-SIM connection switching includes switching to the second SIM for communication operation when the communication operation is performed through the first SIM.

In an embodiment, the support capability includes whether the network side device supports the terminal to perform the multi-SIM connection switching in case that a first condition is satisfied, where the first condition includes at least one of: the first SIM leaves a connected state; or the first SIM remains in the connected state.

In an embodiment, the first SIM leaving the connected state includes the first SIM leaving the connected state based on an access stratum; and/or the first SIM leaving the connected state based on the non-access stratum.

In an embodiment, the first SIM remaining in the connected state includes the first SIM remaining in the connected state based on an access stratum; and/or the first SIM remaining in the connected state based on the non-access stratum.

In an embodiment, the capability indication information is carried in a system information block (SIB).

In an embodiment, the network side device includes a new radio (NR) network side device, and the SIB includes an SIB carried in on-demand system information (SI).

In an embodiment, the capability indication information is carried in radio resource control (RRC) signaling.

In an embodiment, the one or more processors are configured to perform: sending the capability indication information to the terminal when a request of the terminal to acquire the capability indication information is received.

Regarding to the apparatus in the above embodiment, a specific way in which each module performs operations has been described in detail in the embodiment of related methods, and will not be described in detail here.

For the apparatus embodiment, because it basically corresponds to the method embodiment, it is only necessary to refer to the method embodiment for the relevant part of the description. The apparatus embodiments described above are only schematic, where the modules described as separate components may or may not be physically separated, and the components displayed as modules may or may not be physical modules, that is, they may be located in one place or distributed to a plurality of network modules. Some or all of the modules can be selected according to actual needs to achieve the purpose of this embodiment. It can be understood and implemented by a person of ordinary skill in the art without creative labor.

An embodiment of the present disclosure further provides a communication apparatus, including a processor; a memory for storing a computer program; where the capability indication method described in any of the above embodiments is implemented when the computer program is executed by the processor.

An embodiment of the present disclosure further provides a communication apparatus, including: a processor; a memory for storing a computer program; where the capability determination method described in any of the above embodiments is implemented when the computer program is executed by the processor.

An embodiment of the present disclosure further provides a computer-readable storage medium for storing a computer program, which, when executed by a processor, realizes the steps in the capability indication method described in any of the above embodiments.

An embodiment of the present disclosure further provides a computer-readable storage medium for storing a computer program, which, when executed by a processor, realizes the steps in the capability determination method described in any of the above embodiments.

As shown in FIG. 8, FIG. 8 is a schematic block diagram of an apparatus 800 for capability indication illustrated according to an embodiment of the present disclosure. The apparatus 800 may be provided as a base station. Referring to FIG. 8, the apparatus 800 includes a processing component 822, a wireless transmitting/receiving component 824, an antenna component 826, and a signal processing part unique to a wireless interface, and the processing component 822 may further include one or more processors (not shown). One of the processors in the processing component 822 may be configured to implement the capability indication method described in any of the above embodiments.

FIG. 9 is a schematic block diagram of an apparatus 900 for capability determination illustrated according to an embodiment of the present disclosure. For example, the apparatus 900 may be a mobile phone, a computer, a digital broadcasting terminal, a messaging device, a game console, a tablet device, a medical device, a fitness device, a personal digital assistant, etc.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 generally controls the overall operation of the apparatus 900, such as operations associated with display, telephone call, data communication, camera operation and recording operation. The processing component 902 may include one or more processors 920 to execute instructions to complete all or part of steps of the capability determination method. In addition, the processing component 902 may include one or more modules to facilitate interactions between the processing component 902 and other components. For example, the processing component

902 may include a multimedia module to facilitate interactions between the multimedia component 908 and the processing component 902.

The memory 904 is configured to store various types of data to support operations in the apparatus 900. Examples of these data include instructions of any application program or method for being operated on the apparatus 900, contact data, phone book data, messages, pictures, videos, etc. The memory 904 can be implemented by any type of volatile or non-volatile memory device or combinations thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 906 provides power to various components of the apparatus 900. The power component 906 may include a power management system, one or more power supplies, and other components associated with generating, managing and distributing power for the apparatus 900.

The multimedia component 908 includes a screen that provides an output interface between the apparatus 900 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touching, sliding and gestures on the touch panel. The touch sensor may not only sense a boundary of a touching or sliding action, but also detect a duration and a pressure related to the touching or sliding operation. In some embodiments, the multimedia component 908 includes a front camera and/or a rear camera. When the apparatus 900 is in an operation mode, such as a shooting mode or a video mode, the front camera and/or the rear camera can receive external multimedia data. Each front camera and rear camera may be a fixed optical lens system or have focal length and optical zoom capability.

The audio component 910 is configured to output and/or input audio signals. For example, the audio component 910 includes a microphone (MIC) configured to receive external audio signals when the apparatus 900 is in the operation mode, such as a calling mode, a recording mode and a voice recognition mode. The received audio signal may be further stored in the memory 904 or transmitted via the communication component 916. In some embodiments, the audio component 910 further includes a speaker for outputting audio signals.

The I/O interface 912 provides an interface between the processing component 902 and peripheral interface modules, where the peripheral interface modules may be keyboards, click-wheels, buttons, etc. These buttons may include, but are not limited to: home button, volume button, start button and lock button.

The sensor component 914 includes one or more sensors for providing various aspects of state evaluation for the apparatus 900. For example, the sensor component 914 can detect an on/off state of the apparatus 900, a relative positioning of components, for example, the components are the display and the keypad of the apparatus 900, and the sensor component 914 can also detect a position change of the apparatus 900 or a component of the apparatus 900, presence or absence of user contact with the apparatus 900, orientation or acceleration/deceleration of the apparatus 900 and a temperature change of the apparatus 900. The sensor component 914 may include a proximity sensor configured to detect presence of a nearby object without any physical contact. The sensor component 914 may also include an optical sensor, such as a CMOS or CCD image sensor, for use in imaging applications. In some embodiments, the sensor component 914 may further include an acceleration sensor, a gyroscope sensor, a magnetic sensor, a pressure sensor or a temperature sensor.

The communication component 916 is configured to facilitate wired or wireless communication between the apparatus 900 and other devices. The apparatus 900 can access a wireless network based on communication standards, such as WiFi, 2G or 3G, 4G LTE, 5G NR or combinations thereof. In an embodiment, the communication component 916 receives a broadcast signal or broadcast related information from an external broadcast management system via a broadcast channel. In an embodiment, the communication component 916 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the apparatus 900 may be implemented by one or more application-specific integrated circuits (ASIC), digital signal processors (DSP), digital signal processing devices (DSPD), programmable logic devices (PLD), field programmable gate arrays (FPGA), controllers, micro-controllers, micro-processors or other electronic components, for executing the capability determination method.

In an embodiment, a non-transitory computer-readable storage medium is further provided, such as the memory 904 including instructions, where the instructions can be executed by a processor 920 of the apparatus 900 to complete the capability determination method. For example, the non-transitory computer-readable storage medium may be an ROM, a random access memory (RAM), a CD-ROM, a magnetic tape, a floppy disk, an optical data storage device, etc.

Other embodiments of the present disclosure will easily occur to those skilled in the art after considering the specification and practicing the disclosure disclosed herein. The present disclosure is intended to cover any variations, uses or adaptations of the present disclosure, and these variations, uses or adaptations follow general principles of the present disclosure and include common sense or common technical means in the technical field that are not disclosed in the present disclosure. The specification and embodiments are to be regarded as exemplary only, and true scope and spirit of the present disclosure are indicated by the following claims.

It should be understood that the present disclosure is not limited to precise structures described above and shown in the accompanying drawings, and various modifications and changes can be made without departing from its scope. The scope of the present disclosure is limited only by the appended claims.

It should be noted that, relational terms here such as first and second are only used to distinguish one entity or operation from another entity or operation, and do not necessarily require or imply that there is any such actual relationship or order between these entities or operations. Terms "including", "containing" or any other variations thereof are intended to cover non-exclusive inclusion, so that a process, method, object or device including a series of elements not only includes those elements, but also includes other elements not explicitly listed or elements inherent to such process, method, object or device. Without further limitations, an element defined by the phrase "including one" does not exclude the existence of other identical elements in the process, method, object or device including the element.

The methods and apparatuses of the present disclosure are described above in detail. The principle and implementation of the present disclosure are described herein through specific examples. The description about the embodiments of the present disclosure is merely provided for ease of understanding of the method and core ideas of the present disclosure. Persons of ordinary skill in the art can make variations and modifications to the present disclosure in terms of the specific implementations and application scopes according to the ideas of the present disclosure. Therefore, the specification shall not be construed as a limit to the present disclosure.

The invention claimed is:

1. A capability determination method, performed by a terminal, comprising:

receiving capability indication information sent by a network side device; and determining, according to the capability indication information, a support capability of the network side device for the terminal to perform multiple subscriber identity module (multi-SIM) connection switching; wherein a SIM used for receiving the capability indication information in the terminal is in a connected state;

determining whether a support capability of a network side device connected to the SIM used for receiving the capability indication information for the terminal to perform the multi-SIM connection switching matches the capability of the terminal to perform the multi-SIM connection switching; and in case that the support capability of the network side device connected to the SIM used for receiving the capability indication information for the terminal to perform the multi-SIM connection switching matches the capability of the terminal to perform the multi-SIM connection switching, sending information about the terminal to perform the multi-SIM connection switching to the network side device connected to the SIM used for receiving the capability indication information;

wherein the capability indication information is carried in a system information block (SIB);

wherein the network side device comprises a new radio (NR) network side device, and the SIB comprises an SIB carried in on-demand system information (SI).

2. The method according to claim 1, wherein the terminal is provided with a plurality of SIMs, and the plurality of SIMs at least comprise a first SIM and a second SIM, and the multi-SIM connection switching comprises switching to the second SIM for communication operation when communication operation is performed through the first SIM.

3. The method according to claim 2, wherein the support capability comprises whether the network side device supports the terminal to perform the multi-SIM connection switching in case that a first condition is satisfied, wherein the first condition comprises at least one of:

the first SIM leaves a connected state, or the first SIM remains in the connected state;

wherein the first SIM leaves the connected state comprises at least one of:

the first SIM leaves the connected state based on an access stratum, or the first SIM leaves the connected state based on a non-access stratum;

wherein the first SIM remains in the connected state comprises at least one of:

the first SIM remains in the connected state based on an access stratum; or the first SIM remains in the connected state based on a non-access stratum.

4. The method according to claim 1, further comprising: sending an acquisition request to the network side device, wherein the acquisition request is used for requesting the network side device to send the capability indication information.

5. The method according to claim 1, wherein the capability indication information is carried in at least one of:

system information (SI); or radio resource control (RRC) signaling.

6. The method according to claim 5, wherein the capability indication information is carried in a system information block (SIB) of the SI, receiving the capability indication information sent by the network side device comprises:

reading minimum SI sent by the network side device; and reading the SIB according to the minimum SI.

7. The method according to claim 6, wherein the minimum SI sent by the network side device is read in case that a second condition is satisfied, and the second condition comprises at least one of:

the terminal having a plurality of SIM slots, wherein at least two SIM slots have been inserted with SIMs;

the terminal having a plurality of SIM slots, wherein at least two SIM slots have been inserted with SIMs, and at least two SIMs are in an active state;

the terminal having a plurality of SIM slots, wherein at least two SIM slots have been inserted with SIMs, and a second SIM is required to be used for communication operation in case that the first SIM is in the connected state; or the terminal supporting the multi-SIM connection switching.

8. The method according to claim 6, wherein reading the SIB according to the minimum SI comprises:

in case that the network side device broadcasting the SIB is determined according to the minimum SI, and the capability information carried by the SIB is used to indicate that the network side device supports the terminal to perform the multi-SIM connection switching, reading the SIB according to scheduling information in the minimum SI.

9. The method according to claim 6, wherein reading the SIB according to the minimum SI comprises:

in case that the network side device not broadcasting the SIB is determined according to the minimum SI, the SIB is stored in the network side device, and the capability information carried by the SIB is used to indicate that the network side device supports the terminal to perform the multi-SIM connection switching, sending a request to the network side device for acquiring the SIB.

10. The method according to claim 1, wherein a SIM used for receiving the capability indication information in the terminal is in a non-connected state, and the method further comprises:

determining a target network side device that matches a capability of the terminal to perform the multi-SIM connection switching according to support capabilities of a plurality of network side devices for the terminal to perform the multi-SIM connection switching; and performing cell selection or cell reselection of a target cell corresponding to the target network side device.

11. A capability indication method, performed by a network side device, comprising:

sending capability indication information to a terminal, wherein the capability indication information is used for indicating a support capability of the network side device for the terminal to perform multiple subscriber identity module (multi-SIM) connection switching; wherein a SIM used for receiving the capability indication information in the terminal is in a connected state, and the terminal is configured to:

determine whether a support capability of the network side device for the terminal to perform the multi-SIM connection switching matches a capability of the terminal to perform the multi-SIM connection switching; and in case that the support capability of the network side device for the terminal to perform the multi-SIM connection switching matches the capability of the terminal to perform the multi-SIM connection switching, send information about the terminal to perform the multi-SIM connection switching to the network side device;

wherein the capability indication information is carried in a system information block (SIB);

wherein the network side device comprises a new radio (NR) network side device, and the SIB comprises an SIB carried in on-demand system information (SI).

12. The method according to claim 11, wherein the terminal is provided with a plurality of SIMs, and the plurality of SIMs at least comprise a first SIM and a second SIM, and the multi-SIM connection switching comprises switching to the second SIM for communication operation when communication operation is performed through the first SIM.

13. The method according to claim 12, wherein the support capability comprises whether the network side device supports the terminal to perform the multi-SIM connection switching in case that a first condition is satisfied, wherein the first condition comprises at least one of:

the first SIM leaves a connected state, or the first SIM remains in the connected state;

wherein the first SIM leaves the connected state comprises at least one of:

the first SIM leaves the connected state based on an access stratum, or the first SIM leaves the connected state based on a non-access stratum;

wherein the first SIM remains in the connected state comprises at least one of:

the first SIM remains in the connected state based on an access stratum, or the first SIM remains in the connected state based on a non-access stratum.

14. The method according to claim 11, wherein the capability indication information is carried in radio resource control (RRC) signaling.

15. The method according to claim 11, wherein sending the capability indication information to the terminal comprises:

sending the capability indication information to the terminal when a request of the terminal to acquire the capability indication information is received.

16. A capability determination apparatus, comprising one or more processors, and the one or more processors being configured to perform:

receiving capability indication information sent by a network side device; and determining, according to the capability indication information, a support capability of the network side device for a terminal to perform multiple subscriber identity module (multi-SIM) connection switching; wherein a SIM used for receiving the capability indication information in the terminal is in a connected state;

determining whether a support capability of a network side device connected to the SIM used for receiving the capability indication information for the terminal to perform the multi-SIM connection switching matches the capability of the terminal to perform the multi-SIM connection switching; and in case that the support capability of the network side device connected to the SIM used for receiving the capability indication information for the terminal to perform the multi-SIM connection switching matches the capability of the terminal to perform the multi-SIM connection switching, sending information about the terminal to perform the multi-SIM connection switching to the network side device connected to the SIM used for receiving the capability indication information;

wherein the capability indication information is carried in a system information block (SIB);

wherein the network side device comprises a new radio (NR) network side device, and the SIB comprises an SIB carried in on-demand system information (SI).

17. A capability indication apparatus, comprising one or more processors, and the one or more processors being configured to perform the capability indication method according to claim 11.

* * * * *